United States Patent
Sakamoto et al.

(10) Patent No.: US 7,212,514 B2
(45) Date of Patent: May 1, 2007

(54) MOBILE COMMUNICATION DEVICE CONTAINABLE IN AD HOC NETWORK

(75) Inventors: Kiyomi Sakamoto, Ikoma (JP); Atsushi Iisaka, Katano (JP); Atsushi Yamashita, Osaka (JP); Noboru Nomura, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 66 days.

(21) Appl. No.: 10/535,101

(22) PCT Filed: May 21, 2004

(86) PCT No.: PCT/JP2004/007284

§ 371 (c)(1),
(2), (4) Date: May 16, 2005

(87) PCT Pub. No.: WO2004/107656

PCT Pub. Date: Dec. 9, 2004

(65) Prior Publication Data

US 2006/0009248 A1 Jan. 12, 2006

(30) Foreign Application Priority Data

May 29, 2003 (JP) ............................. 2003-152706

(51) Int. Cl.
*H04Q 7/24* (2006.01)

(52) U.S. Cl. ..................... 370/338; 370/328; 455/41.2; 455/414.1; 455/414.2

(58) Field of Classification Search ............... 455/41.2, 455/412.2, 518, 456.3, 414.1, 414.2, 414.3; 370/328, 338
See application file for complete search history.

(56) References Cited

U.S. PATENT DOCUMENTS

| | | | |
|---|---|---|---|
| 6,026,303 A | | 2/2000 | Minamisawa |
| 6,898,423 B2 * | | 5/2005 | Motegi et al. ........... 455/414.2 |
| 2003/0050977 A1 * | | 3/2003 | Puthenkulam et al. ...... 709/204 |
| 2003/0081567 A1 * | | 5/2003 | Okanoue et al. ............ 370/328 |
| 2003/0083061 A1 * | | 5/2003 | Robinson et al. ........... 455/425 |
| 2003/0091015 A1 | | 5/2003 | Gassho et al. |
| 2004/0230374 A1 * | | 11/2004 | Tzamaloukas ............... 701/217 |
| 2004/0233855 A1 * | | 11/2004 | Gutierrez et al. ........... 370/252 |

FOREIGN PATENT DOCUMENTS

| | | |
|---|---|---|
| JP | 8-047046 | 2/1996 |
| JP | 10-145276 | 5/1998 |
| JP | 2001-036459 | 2/2001 |
| JP | 2002-176403 | 6/2002 |
| JP | 2003-143156 | 5/2003 |

* cited by examiner

Primary Examiner—Matthew Anderson
Assistant Examiner—Tuan Pham
(74) Attorney, Agent, or Firm—Wenderoth, Lind & Ponack, L.L.P.

(57) ABSTRACT

In a mobile communication device, when an inquiry packet sent from another mobile communication device for inquiring whether to accept or deny the participation in an ad hoc network is transferred to a work area, a transmission/reception control section determines whether or not a denial flag set in a storage device is 1. When the denial flag is 1, the transmission/reception control section generates a first response for denying the participation in the ad hoc network, and transmits the first response through a transmission/reception section to the other mobile communication device that transmitted the inquiry packet.

15 Claims, 13 Drawing Sheets

LINK INFORMATION

OWN NODE ID: XXXX
DENIAL FLAG: 0/1
HOP LIMIT: N1
RETRY TIME: T
NUMBER OF TRIALS: N2
ENDPOINT NODE ID: YYYY

| STARTPOINT NODE ID | ENDPOINT NODE ID | HOP LIMIT | USER'S AGE | DATAGRAM |

MOBILE COMMUNICATION DEVICE CONTAINABLE IN AD HOC NETWORK

TECHNICAL FIELD

The present invention relates to a mobile communication device, and more particularly, to a mobile communication device containable in an ad hoc network.

BACKGROUND ART

Mobile communication systems include any ad hoc network system, without requiring any existing infrastructure as typified by a server, an exchange, and a base station, where a mobile communication device finds a communication path by itself, and uses the found communication path to communicate with another mobile communication device.

In conventional ad hoc network systems, a tentative master device is determined from among a plurality of mobile communication devices that are operable to serve as both a master device and a slave device, and the other mobile communication devices are determined as slave devices. In such a state, when data exchange between the master device and the slave devices is enabled, a transfer rate measured by using a test signal, and the residual power of a storage battery of each slave device are transmitted from the slave device to the master device. The master device reselects a true master device based on each transfer rate and each residual power collected in a manner as described above.

SUMMARY OF THE INVENTION

Incidentally, for special reasons, users may be unwilling to incorporate their mobile communication devices into an ad hoc network. However, the conventional ad hoc network systems are disadvantageous in that the mobile communication devices are incorporated into the ad hoc networks without taking account of the circumstances of the mobile communication devices and their users. Accordingly, unless the above-mentioned users' needs are satisfied, it is difficult to accelerate the spread of the ad hoc network systems.

Therefore, an object of the present invention is to provide a mobile communication device which is not contained in an ad hoc network under specific circumstances.

To achieve the above object, a first aspect of the present invention is directed to a mobile communication device capable of data communication through an ad hoc network. The mobile communication device comprises: a reception section for receiving inquiry information for inquiring whether to accept or deny participation in the ad hoc network, where the inquiry information is sent from another mobile communication device; a condition determination section for, after the reception section receives the inquiry information, determining whether or not at least one preset condition is satisfied; and a transmission section for generating information for denying the participation in the ad hoc network based on a determination result of the condition determination section, and for transmitting the generated information to the other mobile communication device.

Typically, the condition determination section determines whether or not the at least one condition is satisfied based on a state of the mobile communication device.

By way of example, the mobile communication device further includes a storage device for storing information indicating whether or not to accept the participation in the ad hoc network based on a user's input. Here, when the condition determination section determines that the information stored in the storage device indicates no acceptance of the participation in the ad hoc network, the transmission section generates the information for denying the participation in the ad hoc network.

By way of example, the mobile communication device further includes a state detection section for detecting whether or not the device itself is in communication. Here, when the condition determination section determines that the state detection section has detected the mobile communication device as being in communication, the transmission section generates the information for denying the participation in the ad hoc network.

By way of example, the mobile communication device further includes a storage device having stored therein a scheduled time at which the device itself engages in communication. Here, when the condition determination section determines that the scheduled time stored in the storage device is reached after a lapse of a predetermined period of time, the transmission section generates the information for denying the participation in the ad hoc network.

By way of example, the mobile communication device further includes a residual power detection section for detecting a residual power of a battery in the device itself. Here, when the condition determination section determines that the residual power detected by the residual power detection section is less than or equal to a predetermined reference value, the transmission section generates the information for denying the participation in the ad hoc network.

By way of example, the mobile communication device further includes a storage device having stored therein a database describing a chargeable point for the device itself, and a position detection section for detecting a current position of the device itself. Here, when the condition determination section determines that a distance from the current position detected by the position detection section to the chargeable point stored in the storage device is less than or equal to a predetermined reference value, the transmission section generates information for accepting the participation in the ad hoc network if the residual power detected by the residual power detection section is less than or equal to a predetermined reference value.

By way of example, the mobile communication device further includes a storage section having stored therein the age of a user of the device. Here, when the age of the user, which is stored in the storage section, is equal to or more than a predetermined reference value, the transmission section generates information for accepting the participation in the ad hoc network regardless of another condition.

By way of example, the mobile communication device further includes a storage section having stored therein information indicating a driving history of a user of the device itself. Here, when the age of the user, which is stored in the storage section, is equal to or more than a predetermined reference value, the transmission section generates the information for denying the participation in the ad hoc network.

Typically, the mobile communication device is mounted in a vehicle.

A second aspect of the present invention is directed to a method for a mobile communication device to perform data communication through an ad hoc network. The method comprising: a reception step of receiving inquiry information for inquiring whether to accept or deny participation in the ad hoc network, where the inquiry information is sent from another mobile communication device; a condition determination step of, after the inquiry information is received at the reception step, determining whether or not at least one preset condition is satisfied; and a transmission step of generating information for denying the participation in the ad hoc network based on a determination result of the condition determination step, and transmitting the information to the other mobile communication device.

By way of example, the data communication method is implemented by a computer program. Also, the computer program is typically stored in a storage medium.

According to the above first and second aspects, when a predetermined condition is satisfied, the mobile communication device denies the participation in the ad hoc network. Thus, it is possible to allow the mobile communication device not to be incorporated into the ad hoc network depending on the circumstances of the device itself and the user thereof.

These and other objects, features, aspects and advantages of the present invention will become more apparent from the following detailed description of the present invention when taken in conjunction with the accompanying drawings.

DETAILED DESCRIPTION OF THE INVENTION

Embodiments

Figure 1:
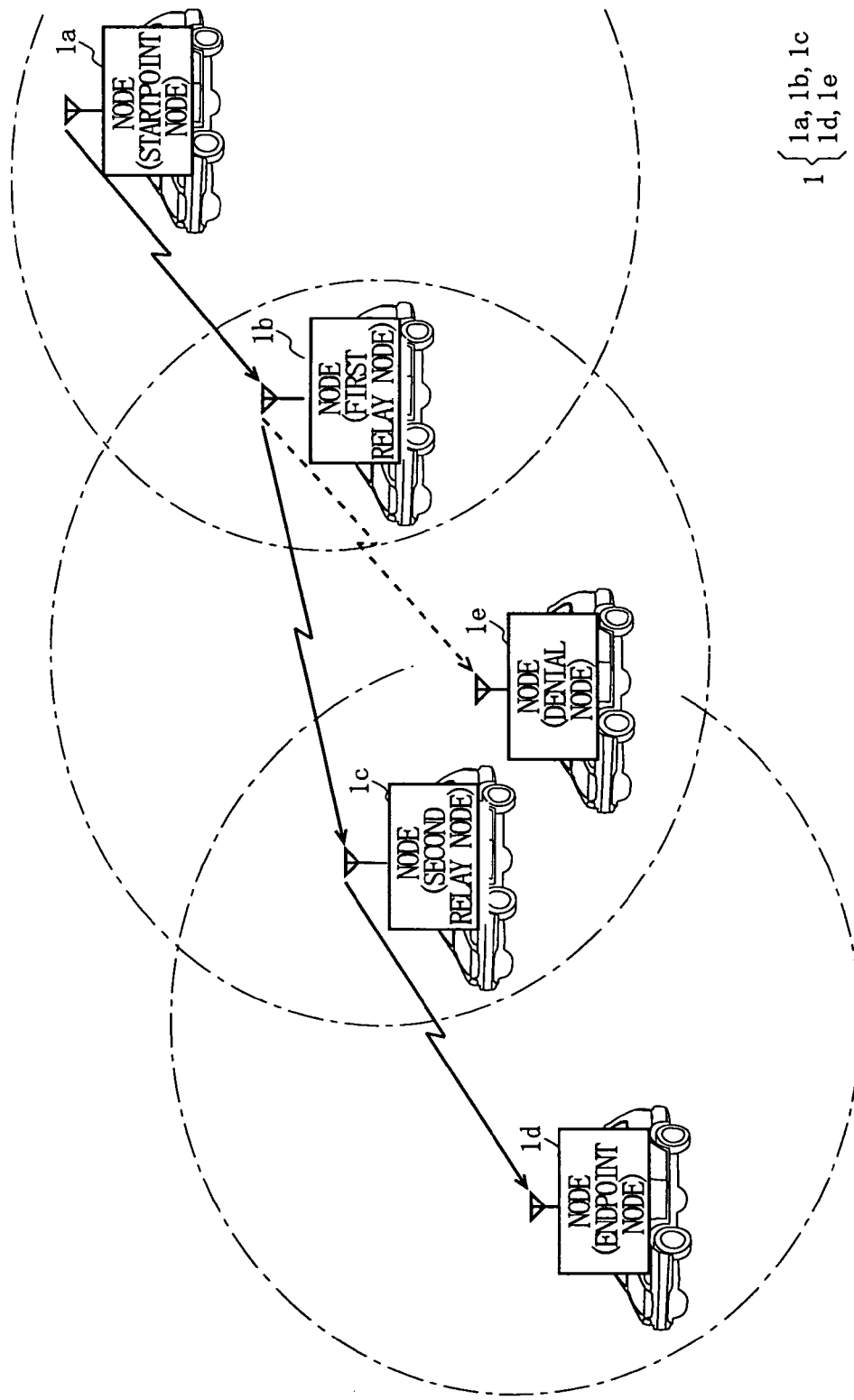
FIG. 1 is a schematic diagram illustrating an exemplary ad hoc network established by a mobile communication device (node) 1 according to an embodiment of the present invention.

FIG. 1 is a schematic diagram illustrating a configuration of an ad hoc network system according to an embodiment of the present invention. In FIG. 1, the ad hoc network system is separated from and independent of an existing infrastructure as typified by a server, an exchange, and a base station, and the ad hoc network system is autonomously constructed by a plurality of mobile communication devices 1. Typically, a mobile communication device 1 is included in a vehicle-mountable apparatus (e.g., a navigation apparatus), a PDA (Personal Digital Assistant), or a mobile apparatus such as a mobile telephone. Note that in the present embodiment, the mobile communication device 1 is referred to below as a "node 1" for convenience.

Figure 2:
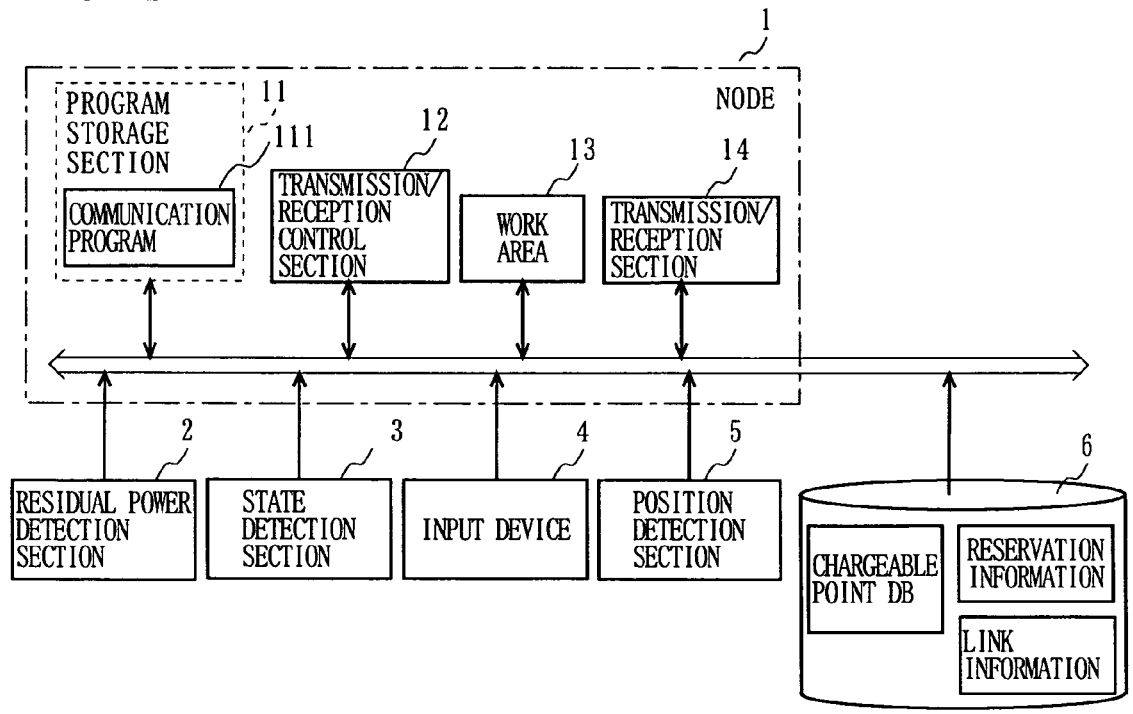
FIG. 2 is a block diagram illustrating a configuration of the node 1 in FIG. 1.

As shown in FIG. 2, the node 1 includes a program storage section 11, a transmission/reception control section 12, a work area 13, and a transmission/reception section 14. The program storage section 11 is typically composed of a ROM (Read Only Memory) having stored therein a computer program (hereinafter, "communication program") 111 describing a communication protocol that is unique to the present embodiment. The transmission/reception control section 12 controls data transmission/reception by using the work area 13 in accordance with the communication program 111. The transmission/reception section 14 receives/transmits data from/to another node 1 under the control of the transmission/reception control section 12.

Also, the node 1 is connected to and capable of communicating with peripheral devices including a residual power detection section 2, a state detection section 3, an input device 4, a position detection section 5, and a storage device 6.

The residual power detection section 2 detects the residual power of a battery provided in a mobile apparatus including the node 1. Note that the residual power detection section 2 is suitable for mobile devices, such as mobile telephones and PDAs, which require recharging from a commercial power supply and whose operating time on a single charge is relatively short. On the other hand, the residual power detection section 2 is not necessarily required for vehicle-mounted apparatuses which receive a voltage supply from a vehicle-mounted lead storage battery. However, it is preferable to provide the residual power detection section 2 to an apparatus mounted in a vehicle, such as an electric vehicle or a hybrid car, which requires recharging with high frequency.

The state detection section 3 detects whether or not the mobile apparatus including the node 1 is currently performing audio communication or data communication.

The input device 4 is operated by a user. The user can operate the input device 4 to initially set whether to allow or deny the participation of the node 1 in an ad hoc network. Also, the user can operate the input device 4 to schedule a time period (hereinafter, referred to as a "scheduled time period") in which the mobile apparatus performs audio communication or data communication.

The position detection section 5 detects the current position of the mobile apparatus. Specifically, when the mobile apparatus is a vehicle-mounted device, the position detection section 5 may be a combination of a GPS (Global Positioning System) receiver and an autonomous navigation sensor, or may be a DRSC (Dedicated Short Range Communication) receiver. Alternatively, when the mobile apparatus is a PHS (Personal Handy-phone System), the position detection section 5 detects the current position of the mobile apparatus based on information obtained from a nearby base station. Alternatively still, when the mobile apparatus is a mobile telephone or a PDA, the position detection section 5 detects the current position of the mobile apparatus through a module incorporating a GPS receiver.

The storage device 6 is typically a nonvolatile storage device, and has stored therein a rechargeable point database (hereinafter, referred to as a "rechargeable point DB"), reservation information, and link information which is required for establishing an ad hoc network.

The rechargeable point DB is a collection of pieces of position information concerning points (hereinafter, referred to as "service points") for providing a recharge service for mobile apparatuses, such as mobile telephones and PDAs, which require recharging with high frequency.

Also, the reservation information contains at least a scheduled time period inputted by the user operating the input device 4.

Figure 3:
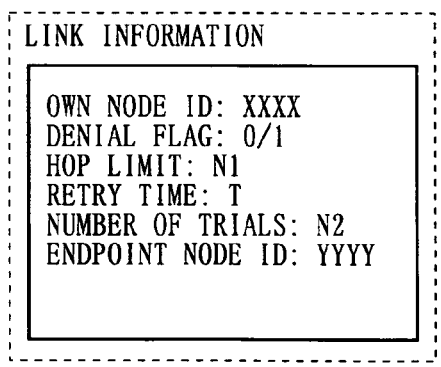
FIG. 3 is a schematic diagram illustrating the contents of link information stored in a storage device 6 in FIG. 2.

Also, as shown in FIG. 3, the link information contains own node identification information (hereinafter, referred to as an "own node ID"), a denial flag, a hop limit, a retry time, the number of trials, and at least one endpoint node identification number (hereinafter, referred to as an "endpoint node ID").

The own node ID is identification information for uniquely specifying the node 1. The hop limit denotes the maximum number of relay nodes within an ad hoc network.

The denial flag is binary information indicating whether to deny or accept the participation of the node 1 in the ad hoc network. In the present embodiment, by way of example, a denial flag of 1 indicates a denial of participating in the ad hoc network, and a denial flag of 0 indicates that the participation in the ad hoc network is acceptable.

The retry time denotes a time period from when the ad hoc network is found to fail in a last data communication until when the data communication is retried.

The number of trials is the number of times of repeatedly transmitting the same data to the same endpoint node 1.

Figure 4:
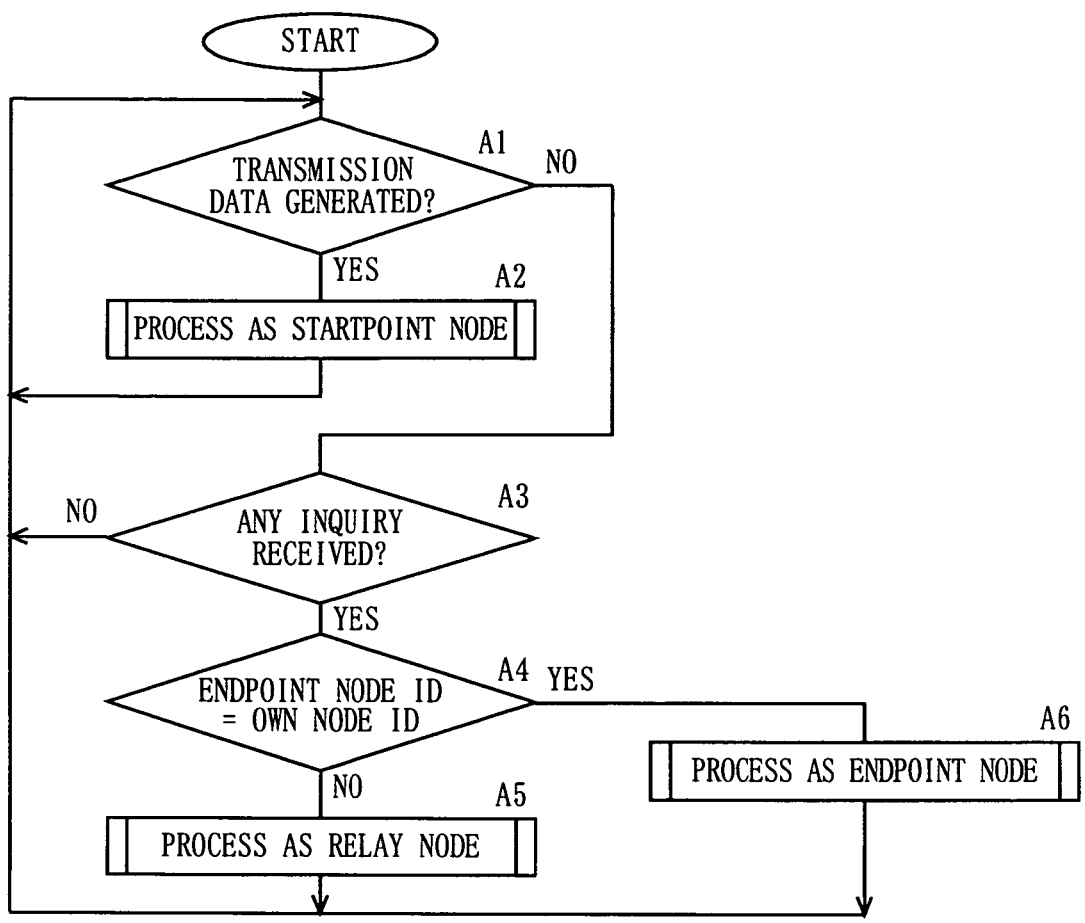
FIG. 4 is a flowchart illustrating the process procedure of the node 1 in FIG. 1.

Next, the operation of the node 1 is described. FIG. 4 is a flowchart illustrating the process procedure of the node 1. In FIG. 4, the transmission/reception control section 12 of the node 1 executes the communication program 111 stored in the program storage section 11, and determines whether or not an upper layer (e.g., an application layer) has generated data that is to be transmitted after an ad hoc network is established (step A1).

Figure 5:
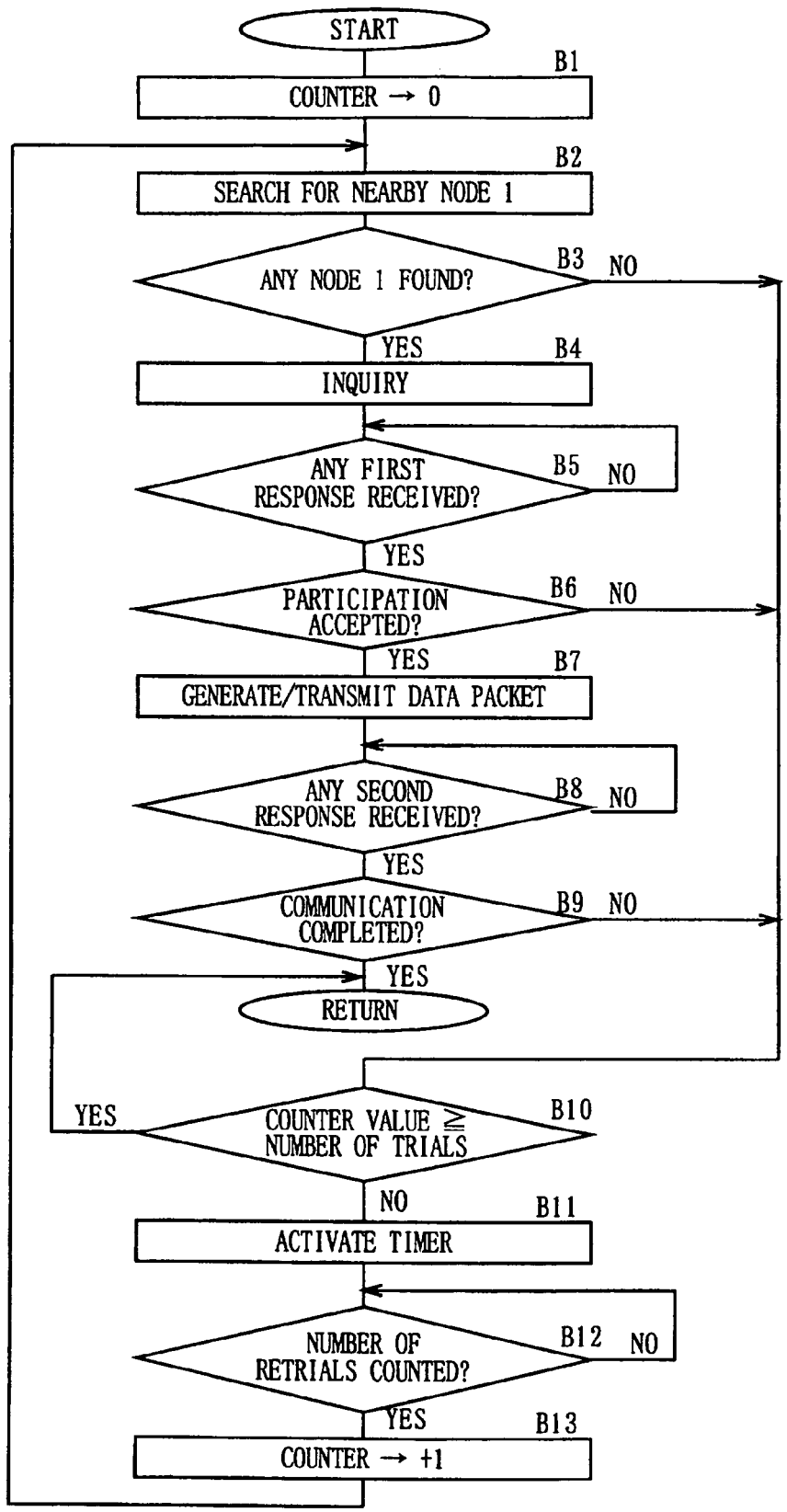
FIG. 5 is a flowchart illustrating the detailed process procedure of step A2 in FIG. 4.

If the data to be transmitted has been generated, the node 1 acts as a start point node 1, and the transmission/reception control section 12 executes a process shown in FIG. 5 (step A2). In FIG. 5, the transmission/reception control section 12 sets a counter for the number of trials to zero (step B1), and thereafter, controls the search for any node (relay node or endpoint node) 1 that is present within the range where radio waves are emitted from its own node 1 (step B2). Note that in the following descriptions, any node 1 to be searched for at step B2 is referred to as a "nearby node 1". At step B2, it is preferable that the start point node 1 emits radio waves which are required for searching for nearby nodes 1 with its directivity increased, preferably, such that only one nearby node 1 can be found. Note that the start point node 1 may emit the required radio waves in all directions to search for the nearby node 1.

Figure 6A:
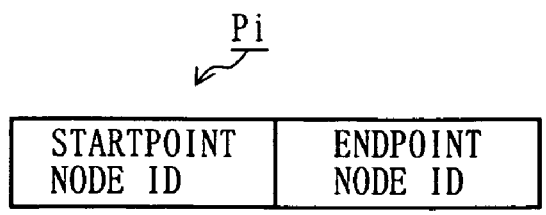
FIG. 6A is a schematic diagram illustrating a data structure of an inquiry packet Pi transmitted/received in the ad hoc network in FIG. 1.

As a result of step B2, if at least one nearby node 1 is found (step B3), the transmission/reception control section 12 inquires the target nearby node 1 whether it accepts or denies the participation in the ad hoc network (step B4). More specifically, the transmission/reception control section 12 acquires the own node ID and the endpoint node ID from the storage device 6. Thereafter, in order to perform the inquiry as described above, the transmission/reception control section 12 generates an inquiry packet Pi, which contains the acquired two IDs as shown in FIG. 6A, on the work area 13, and sends the generated inquiry packet Pi from the transmission/reception section 14 to the target nearby node 1.

After step B4, the transmission/reception control section 12 waits for a first response to be received (step B5). Here, as will become apparent later, the first response is information indicating whether to accept or deny the participation in the ad hoc network, and is sent from the target nearby node 1. The above-described first response is received by the transmission/reception section 14, and is thereafter transferred to the work area 13.

Figure 6B:
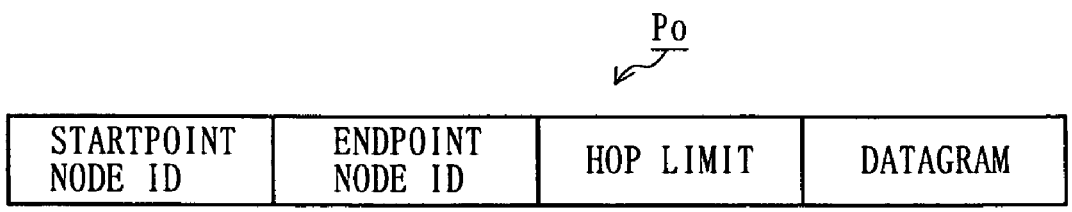
FIG. 6B is a schematic diagram illustrating a data structure of a data packet Po transmitted/received in the ad hoc network in FIG. 1.

After first responses are transferred, if the transmission/reception control section 12 determines that there are any first responses indicating an acceptance of participation in the ad hoc network (step B6), data packets Po as shown in FIG. 6B a regenerated on the work area 13 based on the data to be transmitted, and each of the data packets Po on the work area 13 is sent through the transmission/reception section 14 to any near by nodes 1 having sent the first responses indicating the acceptance of participation in the ad hoc network (step B7). Specifically, the data to be transmitted is divided by a predetermined size into several datagrams. Thereafter, the transmission/reception control section 12 extracts the own node ID, the hop limit, and the endpoint node ID from the storage device 6, and adds them to each datagram to generate several data packets Po as shown in FIG. 6B.

After step B7, the transmission/reception control section 12 waits for a second response to be received (step B8). Here, as will become apparent later, the second response is information indicating whether or not the data communication over the ad hoc network has been completed, is originally generated by an endpoint node 1, which will be described later, and is transmitted to the start point node 1. However, in the ad hoc network, when data communication is conducted between the endpoint node 1 and the start point node 1, at least one relay node 1 may intervene therebetween, and therefore, the second response may be transmitted directly from the endpoint node 1 to the start point node 1, or may be transmitted through the relay node 1 to the start point node 1. The above-described second response is received by the transmission/reception section 14 in the start point node 1, and is thereafter transferred to the work area 13.

After the second response is transferred, if the transmission/reception control section 12 determines that the received response indicates the completion of the data communication (step B9), the process of FIG. 5 (step A2 in FIG. 4) is terminated. Thereafter, the transmission/reception control section 12 returns to step A1. On the other hand, if the second response does not indicate the completion of the data communication, the transmission/reception control section 12 determines whether or not the value of the counter is equal to or more than the number of trials (step B10). If the value of the counter is equal to or more than the number of trials, the transmission/reception control section 12 terminates the process of FIG. 5 (step A2 in FIG. 4). Thereafter, the transmission/reception control section 12 returns to step A1.

On the other hand, if the value of the counter is less than the number of trials, the transmission/reception control section 12 activates a timer (not shown) (step B11), and thereafter, waits for the timer to count the retry time (see FIG. 3) (step B12). After a lapse of the retry time, the transmission/reception control section 12 increments the counter for the number of trials by 1 (step B13), and thereafter, returns to step B2. As described above, if the data communication has not been completed, the start point node 1 tries to conduct data communication the number of times defined by the number of trials at intervals of at least the retry time.

Also, in the case where no nearby node 1 is found at step B3, if it is determined at step B7 that all first responses indicate the denial of participation, the transmission/reception control section 12 also performs the above step B10.

Here, FIG. 4 is referred to again. At step A1, if no data to be transmitted has been generated, the transmission/reception control section 12 determines whether or not any inquiry packet Pi to be sent at step B4 or at step C11 has been received (step A3). As described above, the inquiry packet Pi is information for requesting the first response, and is sent from the startpoint node 1 or there lay node 1. The above inquiry packet Pi is received by the transmission/reception section 14, and is thereafter transferred to the work area 13. At step A3, if no inquiry packet Pi has been received, the transmission/reception control section 12 returns to step A1.

Figure 7:
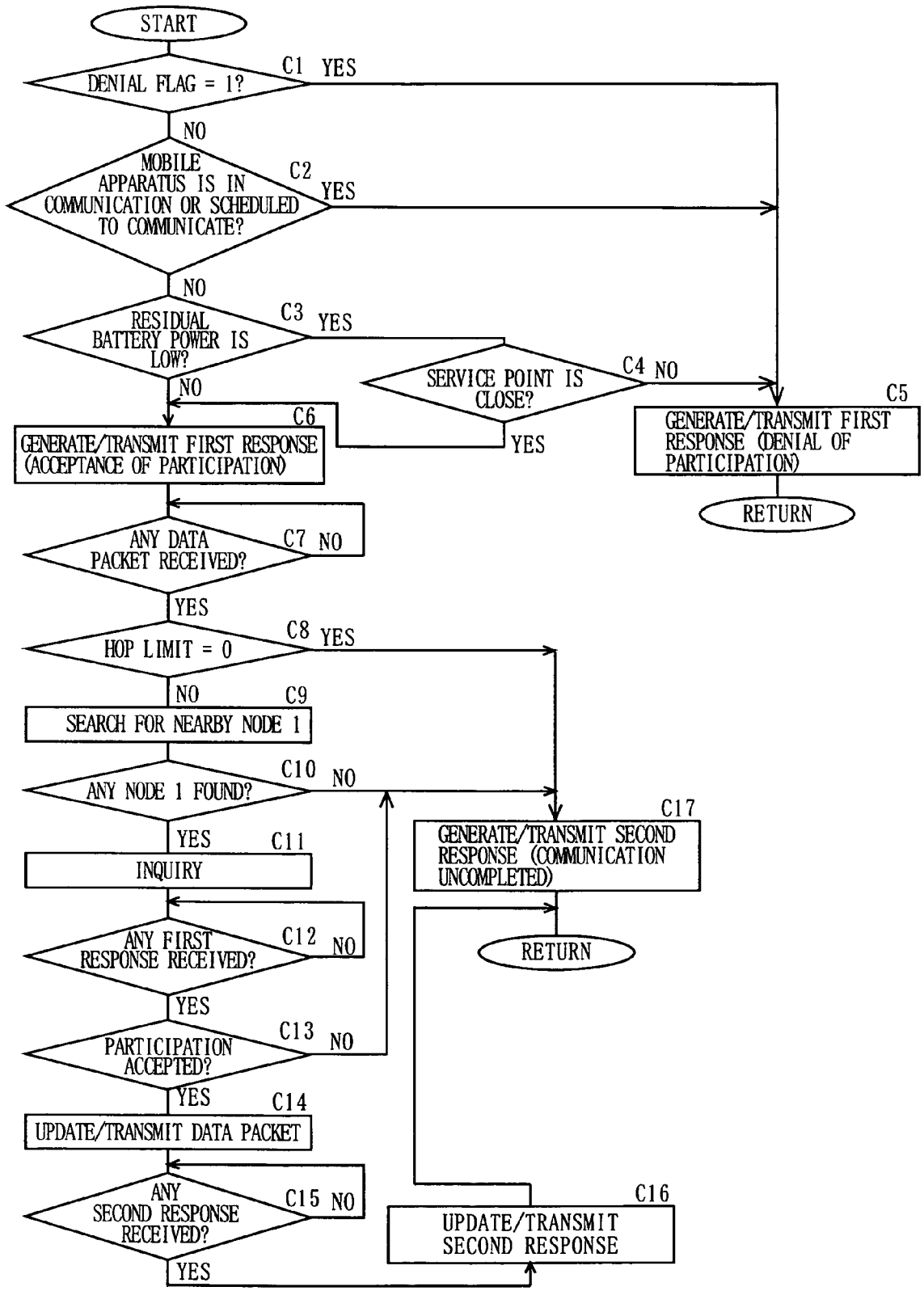
FIG. 7 is a flowchart illustrating the detailed process procedure of step A5 in FIG. 4.

On the other hand, if any inquiry packet Pi has been received at step A3, the transmission/reception control section 12 determines whether or not the endpoint node ID contained in the received packet Pi matches the own node ID stored in the storage device 6 (step A4). If the two IDs do not match, the node 1 acts as a relay node 1, and the transmission/reception control section 12 performs a process as shown in FIG. 7 (step A5). In FIG. 7, the transmission/reception control section 12 determines whether or not the denial flag set in the storage device 6 is 1 (step C1). If the denial flag is 1, the transmission/reception control section 12 performs step C5, which will be described later.

On the other hand, if the denial flag is not 1, the transmission/reception control section 12 determines, based on a detection result of the state detection section 3, whether or not the mobile apparatus including the node 1 is currently performing audio communication or data communication. Further, the transmission/reception control section 12 refers to the reservation information in the storage device 6, and determines whether or not the audio communication or data communication starts within a predetermined time period (step C2). If the communication is determined as being performed or scheduled, the transmission/reception control section 12 deems that the participation in the ad hoc network is not possible, and performs step C5, which will be described later.

On the other hand, if the mobile apparatus is determined as not being in communication or as not being scheduled to communicate, the transmission/reception control section 12 determines, based on a detection result of the residual power detection section 2, whether or not the residual power of the battery in the mobile apparatus including the node 1 is less than or equal to a predetermined reference residual power (step C3). If the residual power is determined as low, the transmission/reception control section 12 deems that the participation in the ad hoc network is not possible, and performs step C6, which will be described later.

On the other hand, if the residual power is not low, the transmission/reception control section 12 obtains the current position from the position detection section 5, and thereafter, obtains position information concerning a service point closest to the current position from the rechargeable point DB stored in the storage device 6. Thereafter, the transmission/reception control section 12 derives the distance from the current position to the closest service point, and determines whether or not the derived distance is less than or equal to a predetermined reference distance (step C4).

If YES is determined at any of the above steps C1, C2, and C4, the transmission/reception control section 12 generates a first response indicating a denial of participating in the ad hoc network, and sends the generated first response to a node (start point node or another relay node) 1 having transmitted the current inquiry packet Pi (step C5). Thereafter, the transmission/reception control section 12 exits the process of FIG. 7, and terminates the process as a relay node 1 (step A5 in FIG. 4).

If NO is determined at any of the above steps C3 and C4, the transmission/reception control section 12 generates, on the work area 13, a first response indicating an acceptance of participating in the ad hoc network, and sends the generated first response from the transmission/reception section 14 to the node (start point node or another relay node) 1 having transmitted the current inquiry packet Pi (step C6).

After step C6, the transmission/reception control section 12 wais for data packets Po or Pr (to be described later) to be transmitted from the node (start point node or another relay node) 1 having transmitted the current inquiry packet Pi (step C7).

The data packets Po or Pr are received by the transmission/reception section 14, and are thereafter transferred to the work area 13. After the data packets Po are transferred, the transmission/reception control section 12 determines whether or not hop limits in the received packets Po are 0 (step C8). If the hop limits are not 0, the transmission/reception control section 12 deems that the received data packets Po can be relayed, and searches for a nearby node 1 as in the above step B2, (step C9). If any nearby node 1 is found (step C10), the transmission/reception control section 12 performs an inquiry on the target nearby node 1 as in the above step B4 (step C11).

Figure 6C:
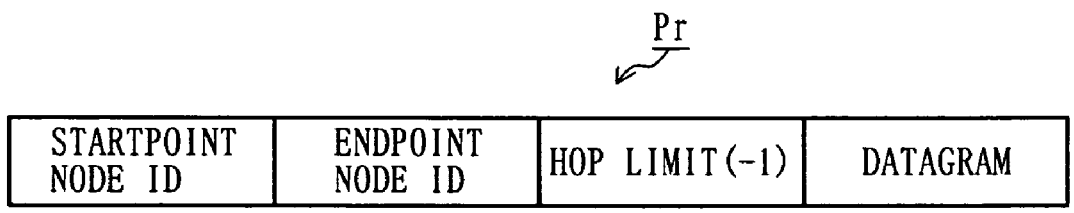
FIG. 6C is a schematic diagram illustrating a data structure of a data packet Pr transmitted/received in the ad hoc network in FIG. 1.

Thereafter, as in the above steps B5 and B6, the transmission/reception control section 12 receives first responses from target nearby nodes 1 (step C12), and determines whether or not there is any nearby node 1 which accepts the participation in the ad hoc network (step C13). If the transmission/reception control section 12 determines that there is any nearby node 1 which accepts the participation in the ad hoc network, the hop limits of the data packets Po currently stored in the work area 13 (see FIG. 6B) are incremented by 1, and data packets Pr as shown in FIG. 6C are generated on the work area 13. Such data packets Pr are sent from the work area 13 through the transmission/reception section 14 to any nearby node 1 having accepted the participation in the ad hoc network (step C14).

After step C14, upon receipt of a second response sent from any nearby node 1, the transmission/reception control section 12 transmits a reception response to the node (start point node or another relay node) 1 having given the current inquiry to the node 1 thereof (step C16). Thereafter, the transmission/reception control section 12 exits the process of FIG. 7, and terminates the process as a relay node 1 (step A5 in FIG. 4).

Also, if the hop limit is 0 at step C8, or if there is no nearby node 1 which accepts the participation in the ad hoc network at step C13, the transmission/reception control section 12 generates, on the work area 13, a second response indicating that the data communication has not been completed, and sends the generated second response through the transmission/reception section 14 to the node (start point node or another relay node) 1 having given the current inquiry to the node 1 thereof (step C17). Thereafter, the transmission/reception processing section 12 exits the process of FIG. 7, and terminates the process as a relay node 1 (step A5 in FIG. 4).

Figure 8:
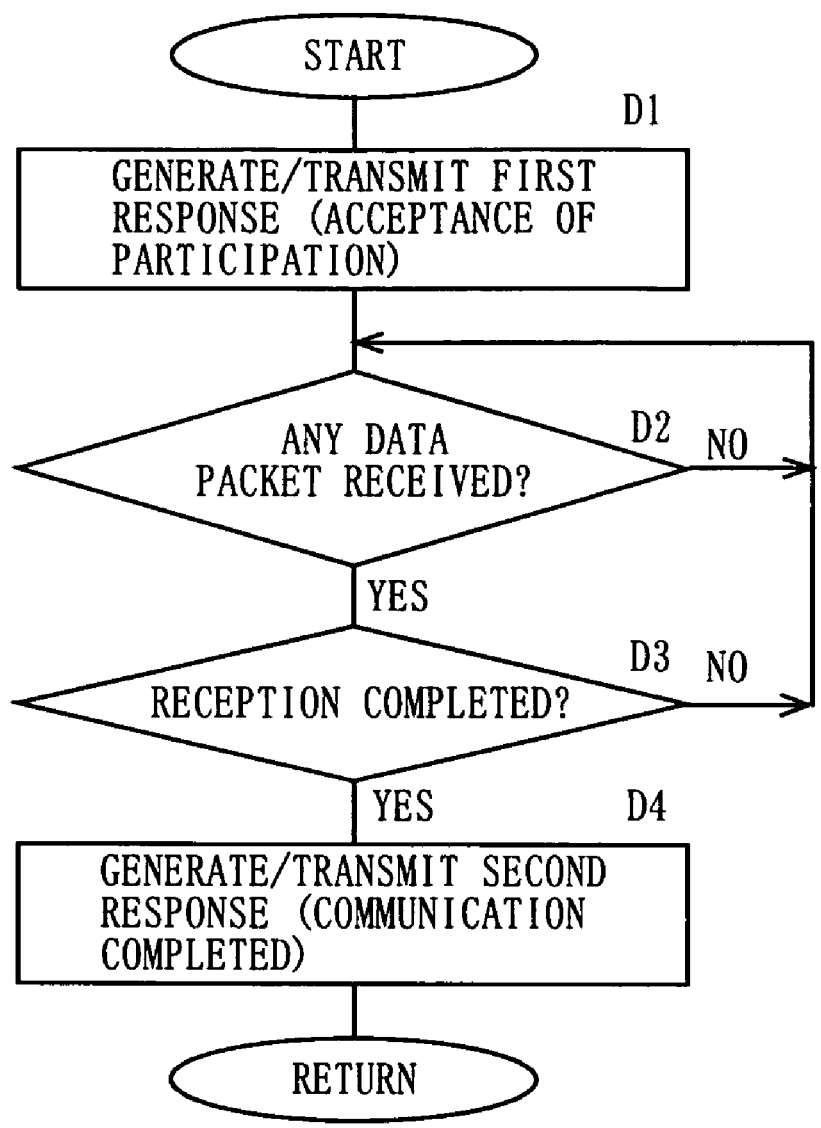
FIG. 8 is a flowchart illustrating the detailed process procedure of step A6 in FIG. 4.

Here, FIG. 4 is referred to again. At step A4, since the endpoint node ID contained in the received inquiry packet Pi matches the own node ID, the node 1 acts as an endpoint node 1, and executes a process as shown in FIG. 8 (step A6). In FIG. 8, as in step C7, the transmission/reception control section 12 waits for any data packet Po or Pr to be transmitted (step D1). After data packets Po or Pr are transferred to the work area 13, the transmission/reception control section 12 sequentially passes the received packets Po or Pr to an upper layer (e.g., an application layer), and, after the last data packet Po or Pr has been received (step D2), the transmission/reception control section 12 generates, on the work area 13, a second response indicating that the data communication has been completed, and the generated second response is sent through the transmission/reception section 14 to the node (start point node or relay node) 1 having given the current inquiry to the node 1 thereof (step D3). Thereafter, the transmission/reception control section 12 exits the process of FIG. 8, and terminates the process as an endpoint node 1 (step A6 in FIG. 4).

Next, an example of data communication in an ad hoc network system as exemplified above is described. In the present embodiment, by way of example, as shown in FIG. 1, an ad hoc network is constructed by four nodes 1*a*–1*d*, and the node 1*a* transmits data through the nodes 1*b* and 1*c* to the node 1*d*. That is, the node 1*a* is a start point node 1*a*, the nodes 1*b* and 1*c* are first and second relay nodes 1*b* and 1*c*, respectively, and the node 1*d* is an endpoint node 1*d*. Also, for the sake of clarifying features of the present embodiment, FIG. 1 further illustrates a node 1*e* which denies the participation in the ad hoc network system. In the following descriptions, the node 1*e* is referred to as a "denial node 1*e*".

Figure 9:
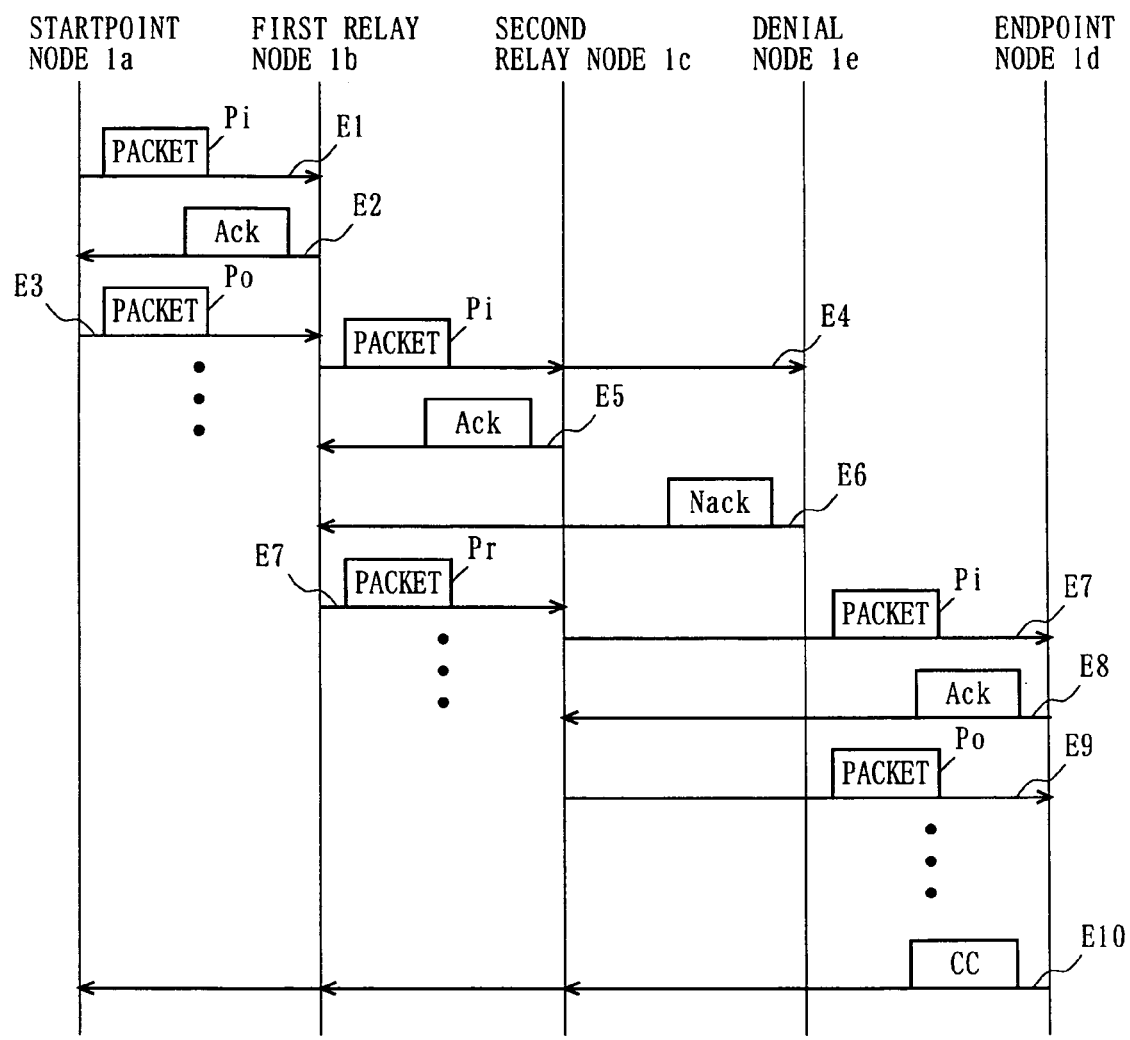
FIG. 9 is a sequence chart illustrating an example of data communication in the ad hoc network in FIG. 1.

In the node 1*a* of FIG. 9, when transmission data to the node 1*d* is generated, the node 1*a* performs the process as a start point node 1 (see FIG. 5). Here, if the nearby node 1*b* is found by performing steps B2 and B3, the node 1*a* as the start point node 1*a* generates an inquiry packet Pi, and transmits the generated inquiry packet P; to the nearby node 1*b* at step B4 (sequence E1 in FIG. 9).

The nearby node 1*b* performs the process as a relay node 1 since the endpoint node ID of the inquiry packet Pi does not match the own node ID (see FIG. 7). Here, if NO is determined at step C3 or C4, at step C6, a first response (indicated as Ack in FIG. 9) indicating the acceptance of participation in the ad hoc network is generated, and consequently, the nearby node 1*b*, as the first relay node 1*b*, returns the generated first response to the start point node 1*a* (sequence E2).

Since the first response indicating the acceptance of participation in the ad hoc network is returned, at step B7, the start point node 1*a* generates a data packet Po, and transmits the generated data packet Po to the first relay node 1*b* (sequence E3).

Upon receipt of the data packet Po from the start point node 1*a*, the first relay node 1*b* performs steps C9 and C10. As a result, if the nearby nodes 1*c* and 1*e* are found, at step C11, the first relay node 1*b* generates an inquiry packet Pi, and transmits the generated inquiry packet P; to the nearby nodes 1*c* and 1*e* (sequence E4).

Here, the nearby node 1*c* performs the process as a relay node since the endpoint node ID in the inquiry packet Pi does not match the own node ID (see FIG. 7). Here, similar to the nearby node 1*b*, the nearby node 1*c* generates a first response indicating the acceptance of participation in the ad hoc network, and, as the second relay node 1*c*, the nearby node 1*c* returns the generated first response to the first relay node 1*b* (sequence E5).

Also, the nearby node 1*e* performs the process as a relay node in response to the inquiry packet Pi, but if YES is determined at any of steps C1, C2, and C4, as the denial node 1*e*, the node 1*e* generates a first response (indicated as Nack in FIG. 9) for denying the participation in the ad hoc network, and returns the generated first response to the first relay node 1*b* (sequence E6).

Since the first response indicating the acceptance of participation is returned, at step B7, the first relay node 1*b* generates a data packet Pr based on the data packet Po, and transmits the generated data packet Pr to the second relay node 1*c* (sequence E7). However, the first relay node 1*b* does not transmit the data packet Pr to the denial node 1*e* having transmitted the first response indicating the denial of participation in the ad hoc network.

Upon receipt of the data packet Pr from the first relay node 1*b*, the second relay node 1*c* performs steps C9 and C10. As a result, if the nearby node 1*d* is found, at step C11, the second relay node 1*c* generates an inquiry packet Pi, and transmits the generated inquiry packet P; to the near by node 1*d* (sequence E8).

Here, the nearby node 1*d* performs the process as an endpoint node since the endpoint node ID in the inquiry packet Pi matches the own node ID (see FIG. 8). In this case, at step D1, the nearby node 1*d* generates a first response indicating the acceptance of participation in the ad hoc network, and, as the endpoint node 1*d*, transmits the generated first response to the second relay node 1*c* (sequence E9). Thereafter, the endpoint node 1*d* receives a data packet Po transmitted from the second relay node 1*c*, and upon completion of the reception, at step D4, the endpoint node 1*d* generates a second response indicating the completion of data communication, and transmits the generated second response to the second relay node 1*c* (sequence E10). The second response is received by the start point node 1*a* via the second relay node 1*c* and the first relay node 1*b*.

As described above, if predetermined conditions (steps C1, C2, and C4 in FIG. 7) are satisfied, the mobile communication device 1 according to the present embodiment denies the participation in the ad hoc network. Thus, it is possible to allow the mobile communication device 1 not to be incorporated into the ad hoc network depending on the circumstances of the device itself and the user thereof. As a result, it is possible to accelerate the spread of the ad hoc network system.

Now, consider a case where the present mobile communication device 1 is mounted in a vehicle, and further, the vehicle's position information and the vehicle's number are added as datagrams to each data packet Po or Pr (see FIG. 6B or FIG. 6C). In this case, by setting, as the endpoint node ID, the ID of a center station of a vehicle emergency call system, such as "HELPNET" in Japan, for example, it becomes possible to use the ad hoc network to realize a service similar to that of the vehicle emergency call system.

Note that in the description of the present embodiment, as the conditions for generating a first response (denial of participation), those illustrated at steps C1–C3 shown in FIG. 7 have been described by way of example. However, this is not restrictive, and in the case where a plurality of mobile communication devices 1 constitute a group, the mobile communication devices 1 may generate and transmit a first response (denial of participation) if they receive an inquiry from a mobile communication device 1 which does not belong in their group.

Variations

Figure 10:
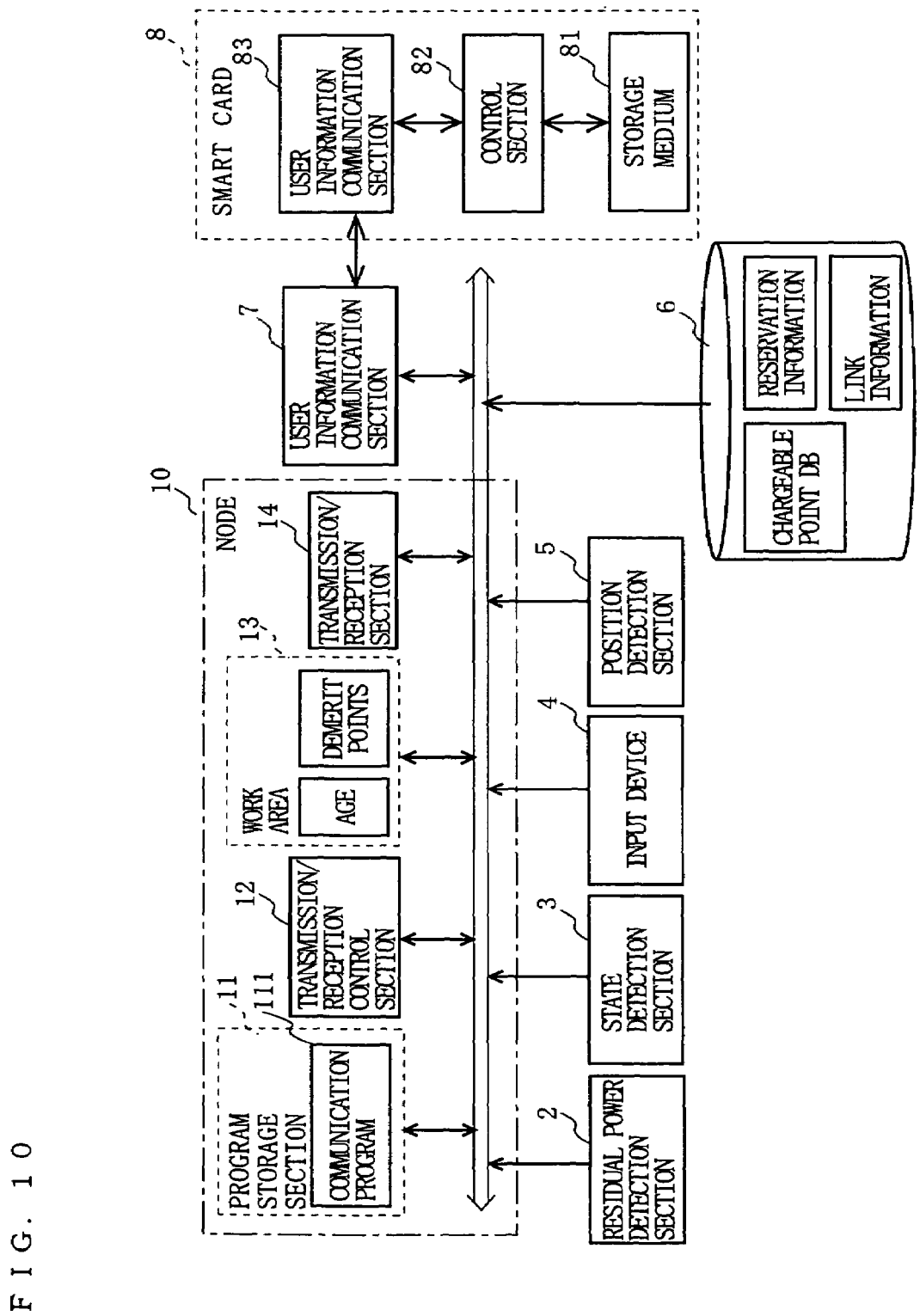
FIG. 10 is a block diagram illustrating a structure of a mobile communication device (node) 10 according to a variation of the mobile communication device 1 shown in FIG. 2.

FIG. 10 is a block diagram illustrating a structure of a mobile communication device (hereinafter, referred to interchangeably as a "node") 10 according to a variation of the above-described embodiment. In terms of block configurations, the mobile communication device 10 in FIG. 10 is different from the mobile communication device 1 in that a user information communication section 7 is further included. Except for this, there is no difference in the block configurations between the two mobile communication devices 1 and 10. Therefore, in FIG. 10, elements corresponding to those shown in FIG. 2 are denoted by the same reference numerals, and the description thereof is omitted.

The user information communication section 7 performs interactive communication with a user information communication section 83 in a smart card 8 under the control of the transmission/reception control section 12. Specifically, when the user information communication section 7 is brought into a state where communication with the smart card 8 is possible, the user information communication section 7 sends a transmission request to the user information communication section 83. Here, the transmission request is data which is stored in the smart card 8 for requesting transmission of information required by the node 10.

The smartcard 8 is preferably an electronic drivers license, and includes a storage medium 81, a control section 82, and the user information communication section 83. Note that in the present embodiment, the smart card is equivalent to an IC (Integrated Circuit) card.

The storage medium 81 has stored there in various information concerning the holder of the smart card 8, i.e., a person who is permitted by authorities to drive a vehicle. As shown in FIG. 10, the information required by the node 10 according to the present variation concerns the age of the holder of the smart card 8 and demerit points lost through previous traffic violations, and any other information is omitted in FIG. 10.

Also, in the smart card 8, the control section 82 receives the transmission request transmitted from the node 10 via the user information communication section 83. In response to the received transmission request, the control section 82 reads the age and the demerit points from the storage medium 81. Thereafter, the control section 82 passes the read information to the user information communication section 83. The user information communication section 83 sends the information received from the control section 82 to the user information communication section 7 of the node 10.

Also, in the node 10, the user information communication section 7 transfers and stores the received age and demerit points onto the work area 13.

Figure 11:
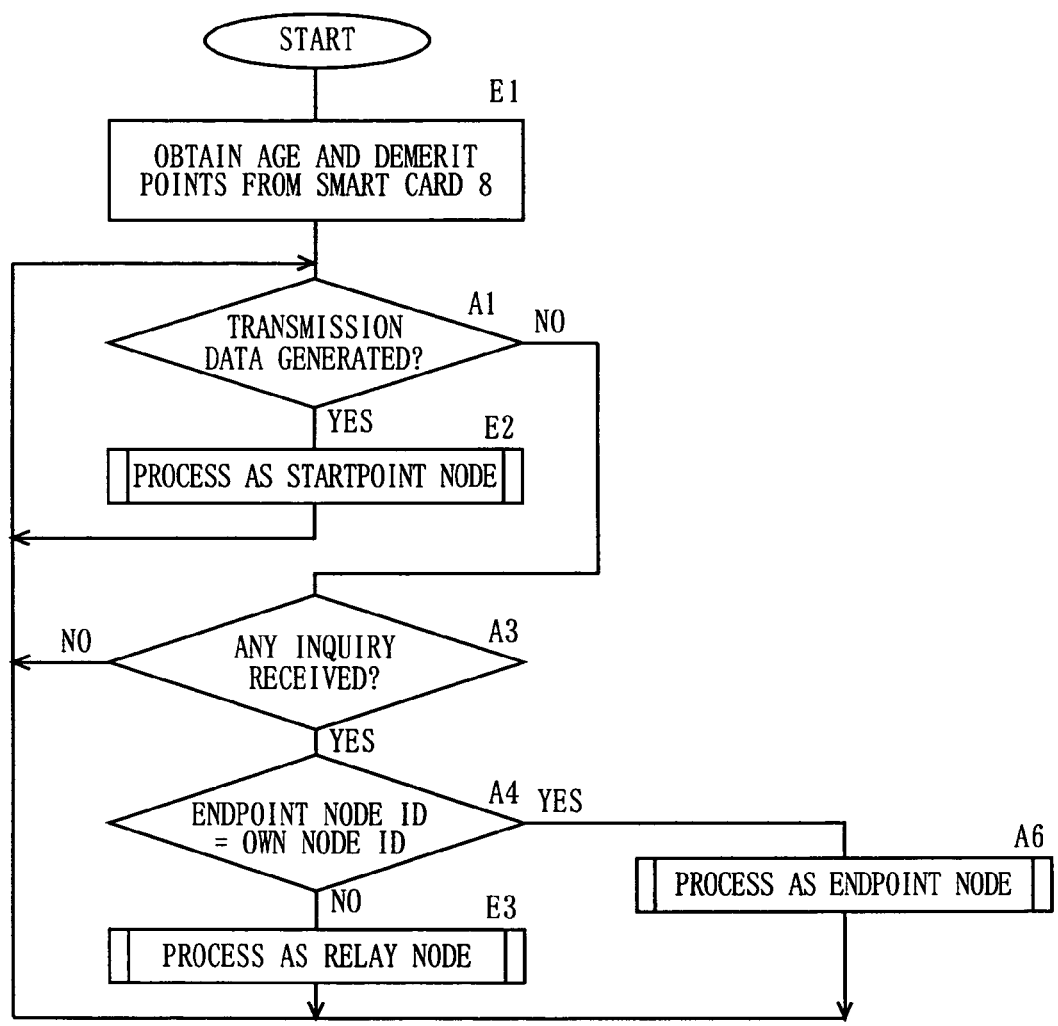
FIG. 11 is a flowchart illustrating the process procedure of the node 10 shown in FIG. 10.

Next, referring to a flowchart in FIG. 11, the operation of the node 10 is described. FIG. 11 is different from FIG. 4 in that step E1 is further included, and steps E2 and E3 are included instead of steps A2 and A5. Since there is no difference between FIG. 11 and FIG. 4 except for the above, steps in FIG. 11 corresponding to those in FIG. 4 are denoted by the same numerals, and the description thereof is omitted.

First, in FIG. 11, the communication program 111 is executed, and further, when the node 10 and the smart card 8 are brought into a state where communication therebetween is possible, as described above, the user information communication section 7 in the node 10 obtains the age and the demerit points from the smart card 8, and transfers and stores them onto the work area 13 (step E1).

Figure 12:
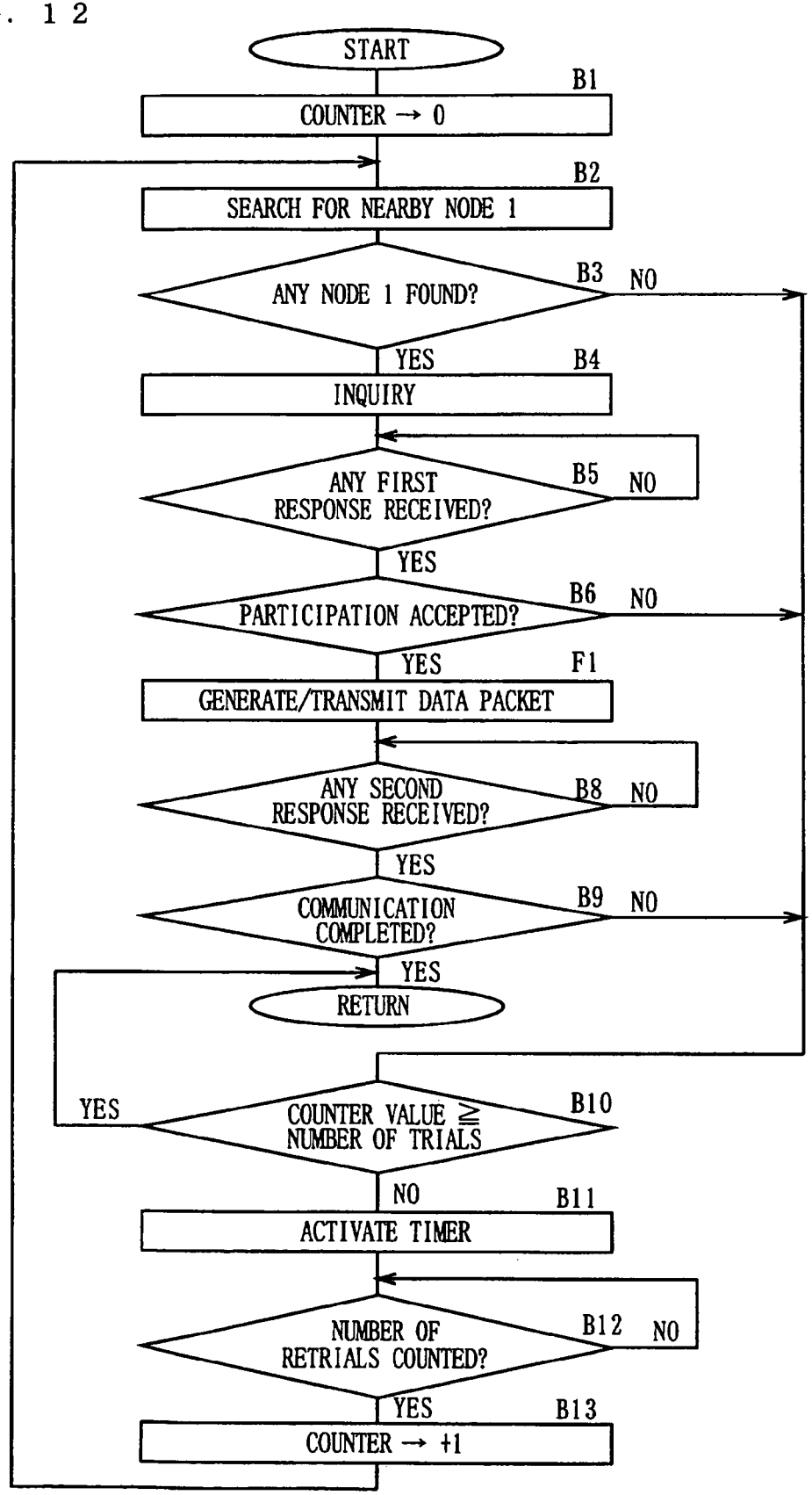
FIG. 12 is a flowchart illustrating the detailed process procedure of step E2 shown in FIG. 11.

Also, if YES is determined at step A1, the node 10 acts as a start point node 10 as in the above-described embodiment (step E2). In this case, the transmission/reception control section 12 performs a process in accordance with the process procedures shown in FIG. 12. FIG. 12 is different from FIG. 5 in that step F1 is included instead of step B7. Except for this, there is no difference between the flowcharts shown in FIG. 12 and FIG. 5. Therefore, steps in FIG. 12 corresponding to those shown in FIG. 5 are denoted by the same numerals, and the description thereof is omitted.

Figure 13:
FIG. 13 is a schematic diagram illustrating a data structure of a data packet Po generated by the node 10 shown in FIG. 10.

If YES is determined at step B6, the transmission/reception control section 12 generates, on the work area 13, data packets Po having a data structure shown in FIG. 13, and sends each of the data packets Po on the work area 13 through the transmission/reception section 14 to any nearby node 1 having transmitted a first response indicating the acceptance of participation (step F1). Specifically, data to be transmitted is divided by a predetermined size into several datagrams. Thereafter, the transmission/reception control section 12 retrieves the own node ID, the hop limit, and the endpoint node ID from the storage device 6, as well as the age of the user of the start point node 10 from the work area 13, and adds them to each datagram to generate several data packets Po as shown in FIG. 13A. When step F1 as described above is completed, the process of the start point node 10 proceeds to step B8.

Figure 14:
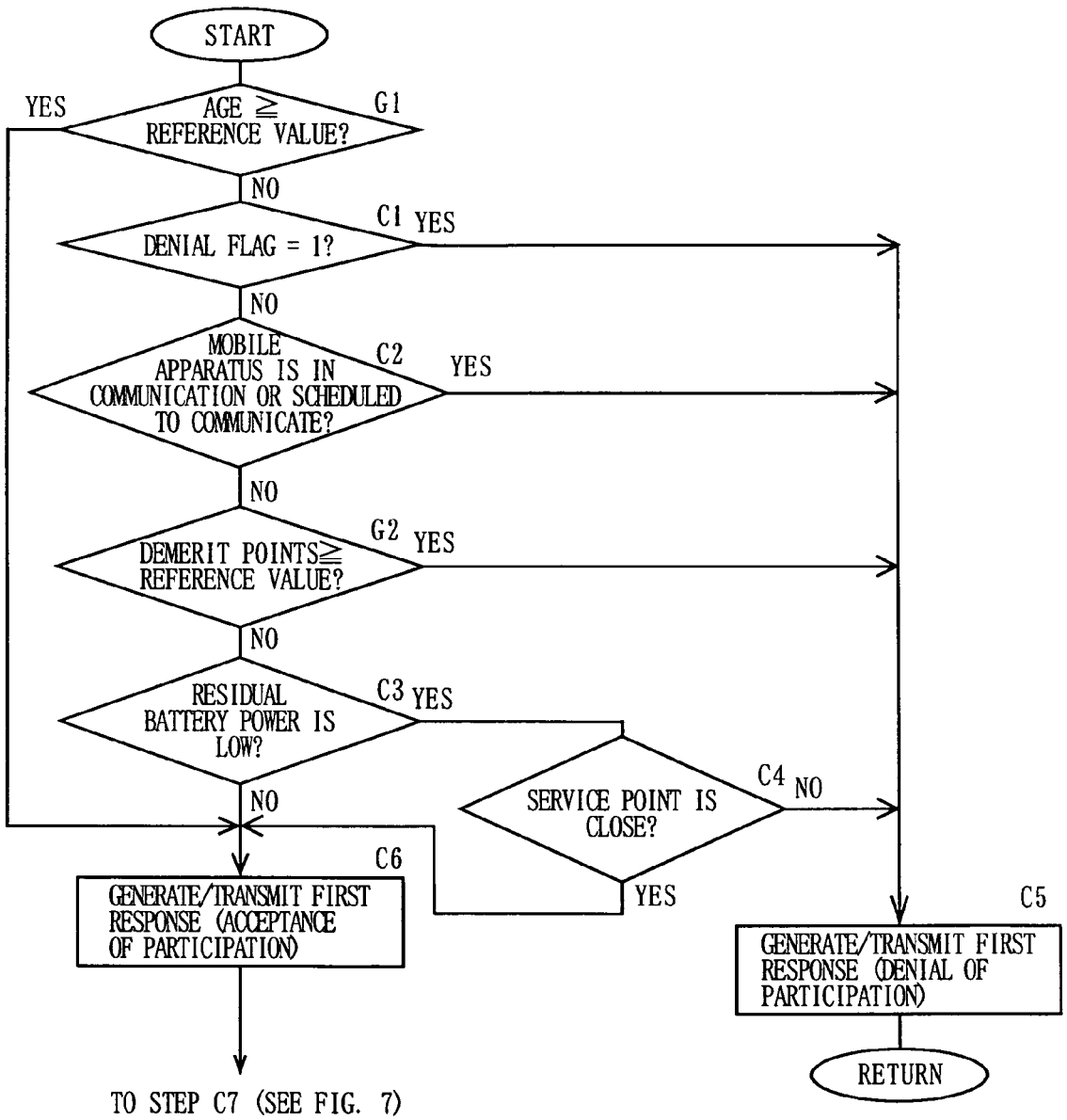
FIG. 14 is a flowchart illustrating the detailed process procedure of step E3 shown in FIG. 11.

Also, if NO is determined at step A4, the node 10 acts as a relay node 10 as in the above-described embodiment (step E3). In this case, the transmission/reception control section 12 performs a process in accordance with the process procedure shown in FIG. 14. FIG. 14 is different from FIG. 7 in that steps G1 and G2 are further included. Except for this, there is no difference between the flowcharts shown in FIG. 14 and FIG. 7. Therefore, steps in FIG. 14 corresponding to those shown in FIG. 7 are denoted by the same numerals, and the description thereof is omitted. Note that for the sake of simplification, in FIG. 14, illustrations from step C8 onward are omitted.

In FIG. 7, before performing step C1, the transmission/reception control section 12 retrieves the age of the user of the start point node 10 from each of the currently received data packets Po, and compares the retrieved age with a prestored first reference value. Here, the first reference value is an index for determining whether or not the user of the start point node 10 is aged, and the first reference value is selected to be roughly 65, for example.

As a result of the above comparison, if the age of the user is equal to or more than the first reference value (step G1), the transmission/reception control section 12 deems that there is a possibility of an emergency call since the data packets Po are from the mobile communication device 10 used by an aged person, and unconditionally performs step C6.

On the other hand, if the age of the user is less than the first reference value, the transmission/reception control section 12 performs step C1.

Also, after step C2, the transmission/reception control section 12 retrieves the user's demerit points stored in the work area 13 within the node 10 thereof. It should be noted that the user as described herein refers to the user of the relay node 10, rather than to the user of the start point node 10.

Thereafter, the transmission/reception control section 12 determines whether or not the retrieved demerit points are equal to or more than a second reference value (step G2). Here, the second reference value is an index indicating whether or not the user frequently commits traffic violations.

If the demerit points are equal to or more than the second reference value, the transmission/reception control section 12 deems that the participation in the ad hoc network is not appropriate since the user of the relay node 10 frequently commits traffic violations, and performs step C5. The reason for performing the process as described above is that there is a possibility that the ad hoc network might be disconnected if the relay node 10 is involved in a traffic violation or accident.

On the other hand, if the demerit points are less than the second reference value, the transmission/reception control section 12 performs step C3.

As described above, according to the present variation, if the user of the start point node 10 is an aged person, the relay node 10 transmits a first response (acceptance of participation) without taking into account any of the conditions of steps C1–C3 and G2, i.e., with out denying the participation in the ad hoc network. Thus, it is possible to provide a mobile communication device 10 which is more suitable for an emergency call. Also, any relay node 10 used by a user with high demerit points is determined to be inappropriate for the participation in the ad hoc network, and therefore, it is possible to provide a mobile communication device 10 which is capable of constructing a more reliable ad hoc network.

Also, consider a case where the present mobile communication device 10 is mounted in a vehicle, and, further, the vehicle's position information and the vehicle's number are added as datagrams to each data packet Po (see FIG. 13). In this case, by setting, as the endpoint node ID, the ID of a center station of a vehicle emergency call system, such as "HELPNET" in Japan, for example, it becomes possible to use the ad hoc network to realize a service similar to that of the vehicle emergency call system.

Note that in the description of the present embodiment, as the conditions for generating a first response (denial of participation), those illustrated at steps C1–C3 shown in FIG. 14 have been described by way of example. However, this is not restrictive, and in the case where a plurality of mobile communication devices 10 constitute a group, the mobile communication devices 10 may generate and transmit a first response (denial of participation) if they receive an inquiry from a mobile communication device 10 which does not belong in their group.

While the invention has been described in detail, the foregoing description is in all aspects illustrative and not restrictive. It is understood that numerous other modifications and variations can be devised without departing from the scope of the invention.

INDUSTRIAL APPLICABILITY

A mobile communication device according to the present invention is suitable for use in, for example, a navigation apparatus, a portable telephone, or a personal computer, which is required to achieve technical effects of being able to autonomously construct a network and deny the participation in a network.

What is claimed is:

1. A mobile communication device capable of data communication through an ad hoc network, said mobile communication device comprising:
   a reception section for receiving inquiry information for inquiring whether to accept or deny participation in the ad hoc network, the inquiry information being sent from another mobile communication device;
   a storage device for storing information indicating whether or not to accept the participation in the ad hoc network based on a user's input;
   a condition determination section for, after said reception section receives the inquiry information, determining whether or not at least one preset condition is satisfied based on a state of said mobile communication device; and
   a transmission section for generating information for denying the participation in the ad hoc network based on a determination result of said condition determination section, and for transmitting the generated information to the other mobile communication device,
   wherein when said condition determination section determines that the information stored in said storage device indicates that the participation in the ad hoc network is not to be accepted, said transmission section is operable to generate the information for denying the participation in the ad hoc network.

2. The mobile communication device according to claim 1, wherein:
   said storage device is operable to store a scheduled time at which said mobile communication device engages in communication; and
   when said condition determination section determines that the scheduled time stored in said storage device is reached after a lapse of a predetermined period of time, said transmission section is operable to generate the information for denying the participation in the ad hoc network.

3. The mobile communication device according to claim 1, wherein:
   said storage device is operable to store an age of a user of said mobile communication device and a driving history of the user of said mobile communication device; and
   when the age of the user, which is stored in said storage section, is equal to or more than a predetermined reference value, said transmission section is operable to generate the information for denying the participation in the ad hoc network.

4. The mobile communication device according to claim 1, wherein said mobile communication device is mounted in a vehicle.

5. A mobile communication device capable of data communication through an ad hoc network, said mobile communication device comprising:
   a reception section for receiving inquiry information for inquiring whether to accept or deny participation in the ad hoc network, the inquiry information being sent from another mobile communication device;
   a state detection section for detecting whether or not said mobile communication device is in communication;
   a condition determination section for, after said reception section receives the inquiry information, determining whether or not at least one preset condition is satisfied based on a state of said mobile communication device; and a transmission section for generating information for denying the participation in the ad hoc network based on a determination result of said condition determination section, and for transmitting the generated information to the other mobile communication device, wherein when said condition determination section determines that said state detection section has detected that said mobile communication device is in communication, said transmission section is operable to generate the information for denying the participation in the ad hoc network.

6. The mobile communication device according to claim 5, wherein said mobile communication device is mounted in a vehicle.

7. A mobile communication device capable of data communication through an ad hoc network, said mobile communication device comprising:

a reception section for receiving inquiry information for inquiring whether to accept or deny participation in the ad hoc network, the inquiry information being sent from another mobile communication device;

a residual power detection section for detecting a residual power of a battery in said mobile communication device;

a condition determination section for, after said reception section receives the inquiry information, determining whether or not at least one preset condition is satisfied based on a state of said mobile communication device; and a transmission section for generating information for denying the participation in the ad hoc network based on a determination result of said condition determination section, and for transmitting the generated information to the other mobile communication device, wherein when said condition determination section determines that the residual power detected by said residual power detection section is less than or equal to a predetermined reference value, said transmission section is operable to generate the information for denying the participation in the ad hoc network.

8. The mobile communication device according to claim 7, further comprising:

a storage device having stored therein a database describing a chargeable point for said mobile communication device; and a position detection section for detecting a current position of said mobile communication device, wherein when said condition determination section determines that a distance from the current position detected by said position detection section to the chargeable point stored in said storage device is less than or equal to a predetermined reference value, said transmission section is operable to generate information for accepting the participation in the ad hoc network if the residual power detected by said residual power detection section is less than or equal to a predetermined reference value.

9. The mobile communication device according to claim 7, wherein said mobile communication device is mounted in a vehicle.

10. A mobile communication device capable of data communication through an ad hoc network, said mobile communication device comprising:

a reception section for receiving inquiry information for inquiring whether to accept or deny participation in the ad hoc network, the inquiry information being sent from another mobile communication device;

a storage device for storing an age of a user of said mobile communication device; and a condition determination section for, after said reception section receives the inquiry information, determining whether or not at least one preset condition is satisfied based on a state of said mobile communication device;

a transmission section for generating information for denying the participation in the ad hoc network based on a determination result of said condition determination section, and for transmitting the generated information to the other mobile communication device, wherein when the age of the user, which is stored in said storage section, is equal to or more than a predetermined reference value, said transmission section is operable to generate information for accepting the participation in the ad hoc network regardless of another condition.

11. The mobile communication device according to claim 10, wherein said mobile communication device is mounted in a vehicle.

12. A method for a mobile communication device to perform data communication through an ad hoc network, said method comprising:

receiving inquiry information for inquiring whether to accept or deny participation in the ad hoc network, the inquiry information being sent from another mobile communication device;

storing information indicating whether or not to accept the participation in the ad hoc network based on a user's input;

determining, after the inquiry information is received, whether or not at least one preset condition is satisfied based on a state of the mobile communication device;

generating information for denying the participation in the ad hoc network based on a determination result of said determining; and transmitting the generated information to the other mobile communication device, wherein when said determining determines that the information stored in said storing indicates that the participation in the ad hoc network is not to be accepted, said generating generates the information for denying the participation in the ad hoc network.

13. A method for a mobile communication device to perform data communication through an ad hoc network, said method comprising:

receiving inquiry information for inquiring whether to accept or deny participation in the ad hoc network, the inquiry information being sent from another mobile communication device;

detecting whether or not the mobile communication device is in communication;

determining, after the inquiry information is received, whether or not at least one preset condition is satisfied based on a state of the mobile communication device;

generating information for denying the participation in the ad hoc network based on a determination result of said determining; and transmitting the generated information to the other mobile communication device, wherein when said determining determines that said detecting has detected that the mobile communication device is in communication, said generating generates the information for denying the participation in the ad hoc network.

14. A method for a mobile communication device to perform data communication through an ad hoc network, said method comprising:

> receiving inquiry information for inquiring whether to accept or deny participation in the ad hoc network, the inquiry information being sent from another mobile communication device;
>
> detecting a residual power of a battery in the mobile communication device;
>
> determining, after the inquiry information is received, whether or not at least one preset condition is satisfied based on a state of the mobile communication device;
>
> generating information for denying the participation in the ad hoc network based on a determination result of said determining; and
>
> transmitting the generated information to the other mobile communication device,
>
> wherein when said determining determines that the residual power detected in said detecting is less than or equal to a predetermined reference value, said generating generates the information for denying the participation in the ad hoc network.

15. A method for a mobile communication device to perform data communication through an ad hoc network, said method comprising:

> receiving inquiry information for inquiring whether to accept or deny participation in the ad hoc network, the inquiry information being sent from another mobile communication device;
>
> storing an age of a user of the mobile communication device;
>
> determining, after the inquiry information is received, whether or not at least one preset condition is satisfied based on a state of the mobile communication device;
>
> generating information for denying the participation in the ad hoc network based on a determination result of said determining; and
>
> transmitting the generated information to the other mobile communication device,
>
> wherein when the age of the user stored in said storing is equal to or more than a predetermined reference value, generating generates information for accepting the participation in the ad hoc network regardless of another condition.

* * * * *